(12) United States Patent
Baugh et al.

(10) Patent No.: US 7,587,057 B2
(45) Date of Patent: Sep. 8, 2009

(54) VIBROACOUSTIC EMULATOR

(75) Inventors: Eric Baugh, San Jose, CA (US);
Fu-Ying Huang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 757 days.

(21) Appl. No.: 10/684,097

(22) Filed: Oct. 10, 2003

(65) Prior Publication Data

US 2005/0078835 A1    Apr. 14, 2005

(51) Int. Cl.
*H09F 27/00* (2006.01)
(52) U.S. Cl. .............................. 381/124; 73/660; 73/662
(58) Field of Classification Search .................... 381/56, 381/58, 124, 60–61, 73.1; 700/94; 361/683–685; 73/660, 662
See application file for complete search history.

(56) References Cited

U.S. PATENT DOCUMENTS

| | | | | |
|---|---|---|---|---|
| 5,237,861 A | * | 8/1993 | Suda et al. | ..................... 73/105 |
| 5,488,857 A | * | 2/1996 | Homma et al. | ................. 73/105 |
| 6,078,468 A | * | 6/2000 | Fiske | ....................... 360/97.01 |
| 6,523,413 B1 | * | 2/2003 | Hoshino et al. | ............... 73/660 |
| 2003/0147173 A1 | * | 8/2003 | Fujie et al. | ............... 360/78.04 |
| 2004/0170282 A1 | * | 9/2004 | Tahara et al. | ................... 381/58 |

\* cited by examiner

*Primary Examiner*—Vivian Chin
*Assistant Examiner*—Paul Disler
(74) *Attorney, Agent, or Firm*—Lumen Intellectual Property Services, Inc.; Darren Gold

(57) ABSTRACT

The present invention is directed towards a family of vibroacoustic emulators to simulate the vibroacoustic characteristics of components of an electronic device. Specific embodiments for simulating a hard disk drive comprise a housing and a vibroacoustic generator coupled to the housing. Various embodiments enable acoustic emulation through a cover side and base side, out-of-plane vibrational emulation to simulate hard disk drive during seek periods, and in-plane vibrational emulation to simulate a hard-disk drive during idle periods. Methods for using the vibroacoustic emulators to characterize system noise are also disclosed.

12 Claims, 7 Drawing Sheets

VIBROACOUSTIC EMULATOR

FIELD OF THE INVENTION

The present invention relates to vibroacoustic emulators.

BACKGROUND OF THE INVENTION

As computers become more pervasive and are increasingly used outside of the traditional office environment (e.g., personal digital video recorders), end users are demanding that their computers produce less and less noise. A typical personal computer includes three main sources of noise: the cooling system (typically a fan), the power supply (and its cooling system), and the hard disk drive. Other components, such as optical drives, typically make noise only on user demand, and therefore are perceived as somewhat less annoying to the end users.

Most end users are concerned with the total amount and quality of noise that they perceive as coming from their computer. Whether the noise is coming primarily from the hard disk drive or the fan directly, or rather involves a resonance of the computer housing caused by vibration of a component, is irrelevant to most users. Although manufacturers of the various components of a computer may successfully reduce the noise of their individual components, the extent to which that noise reduction is perceived by the end user depends strongly upon how the noise and vibration from that component interacts with the rest of the computer.

For instance, the hard-disk-drive-related acoustics of the system are determined by the interaction between the hard disk drive and the remainder of the system. The hard disk drive emits airborne noise directly, which can be altered or contained by the system. The hard disk drive also vibrates both in- and out-of-plane. These vibrations can excite the mechanics of the system, causing the system to radiate sound, or they may be damped by the system and contribute minimally to noise perceived by the end user.

To make the matter yet more complicated, most sounds consist of a broad range of frequencies, and human hearing sensitivity to these frequencies is nonuniform. To approximate the way the human ear responds to sound levels at different frequencies, several frequency-weighting schemes have been used to develop composite decibel scales. The "A-weighted" decibel scale (dB(A)) is the most widely used.

Although the A-weighted sound power level is widely used to state acoustical design goals as a single number, its usefulness is limited because it gives no information on spectral content. A-weighted sound power levels correlate well with human judgments of relative loudness, but give no information on spectral balance. More sophisticated psychoacoustic sound quality metrics such as loudness, sharpness, and roughness better address the human perception of the frequency and time characteristics of emitted noise. However, these metrics are largely not standardized and are a function of the device, its environment, and the distance and direction to the source unlike sound power which is a device property. It is expected that the personal computer and consumer electronics industries will gradually shift from a sound power acoustic specification to a sound quality acoustic specification. Further reduction of noise from current levels, as measured by A-weighted sound power or psychoacoustic loudness, is expected to be a central component of future acoustic specifications.

Computer component manufacturers have typically been concerned with reducing the A-weighted noise produced by their particular component. However, significant reductions in the A-weighted noise of a single component in isolation may not translate into such large reductions in the total A-weighted noise produced by the computer system as a whole. Each contributor to the overall system noise has a certain frequency distribution associated with it. Reducing the noise of one component in a given frequency band may have very little impact at the system level if other components dominate in that band.

From a systems perspective, the situation is usually disappointing; components that have been advertised as being much quieter than their predecessors may have minimal impact on the total system noise. What has not yet been recognized is that this situation also produces opportunities for reducing the loudness of the noise perceived by the end user by shifting the frequency content of the noise without changing the total noise produced by each component. One way to achieve this is by altering the mounting or mechanical interface between the component and the system. In addition, it is important for the component manufacturer not to excite the resonance modes of a given system via the mechanical vibrations from the component.

SUMMARY OF THE INVENTION

The need for such a systems approach to computer-noise reduction has gone unrecognized in the art. By determining the characteristics of the system as a whole, components can be better designed to reduce the total computer noise radiated to the user. To achieve this, it is important to understand how the computer as a whole responds to known inputs of both airborne noise and vibrations. Once the system response is known, the various components can be designed to optimally interact with the system.

To better understand the noise-producing characteristics of electronic devices, a family of vibroacoustic emulators has been developed to simulate the vibroacoustic characteristics of components of the electronic device. As used herein, vibroacoustic is a term that includes both sound and vibration. In complex systems, the propagation of noise through air and solid surfaces can be closely coupled, so consideration of both the airborne sound and the solid-borne vibrations is required.

Although the invention will be described with emphasis on configurations in which the component is a hard-disk drive, those skilled in the art will appreciate that the particulars described herein can be extended to other components, such as fans. Similarly, although the emphasis will be on computers as the electronic device, those skilled in the art will appreciate that the emulators and vibroacoustic analyses disclosed herein can be applied to other electronic devices. In particular, because devices such as TiVo and MP3 jukeboxes usually include a hard disk drive, the application of the vibroacoustic emulators described herein to such electronic devices is straightforward and is intended to be included as part of the invention.

Because vibroacoustic emulators have not previously been used in conjunction with electronic devices, the general vibroacoustic emulator comprises a housing and a means for producing controlled variable vibroacoustic signals that simulate those of an electronic-device component. The means for producing the controlled vibroacoustic signals is coupled to the housing, preferably with the housing coupled to the system in the same manner as the actual component. All means for producing the controlled vibrations should be considered to be included within the scope of the invention.

For vibroacoustic emulation of a hard disk drive a vibroacoustic generator is coupled to a housing. To obtain the best simulation of how the noise from the hard disk drive will interact with the device as a whole, the housing of the vibroacoustic emulator should preferably have dimensions and mechanical attachment fixtures that replicate those of the hard disk drive being emulated.

One particular way in which a hard disk drive generates vibroacoustic signals is through the generation of sound waves from the cover and the base of the drive. One embodiment of the vibroacoustic emulator involves coupling a first speaker to the cover side of the housing and a second speaker to the base side of the housing.

Hard disk drives also produce out-of-plane vibrations, particularly during seek operations. While the primary motion of the actuator during seeking is parallel to the base side (in-plane), vibration modes of the components in the disk drive generate out-of-plane motion. With reference to hard disk drives, the base and the cover sides of the housing tend to be substantially parallel to each other. The out-of-plane direction refers to the direction perpendicular to base side (and therefore also substantially perpendicular to the cover side). In particular embodiments of the vibroacoustic emulator, out-of-plane vibrations are produced with a wire coil suspended in a plane parallel to the base side of the housing. A magnetic field is produced parallel to the plane of the wire coil. Upon sending current through the wire coil, the wire coil will be deflected. Variation of the current through the wire coil, for instance through the use of a signal generator, results in oscillatory motion of the wire coil. An alternate embodiment employs one or more piezoelectric (PZT) actuators to produce vibrations in the out-of-plane direction.

Motors that spin hard disks typically produce in-plane vibrations. In the context of hard disk drives, in-plane vibrations are those that are substantially in a plane parallel to the base side of the housing. Particular embodiments of the vibroacoustic emulator simulate in-plane vibrations through the use of a plurality of in-plane actuators that vibrate substantially parallel to the base side of the housing. These in-plane actuators are preferably coupled to a signal generator and their actuation is phased to simulate the in-plane vibrations generated by a disk-drive motor.

Alternative embodiments of the invention include processes for emulating hard-disk-drive vibroacoustics. Most generally, the method includes generating independently controlled vibroacoustic signals that simulate the principal vibroacoustics of a hard disk drive. In particular, the processes comprise generating acoustic waves that initially travel perpendicular to the base side of the housing (in most embodiments these acoustic waves emanate from both the base and cover sides), generating vibratory motions perpendicular to the base side of the housing (out-of-plane vibrations), and generating vibratory motions in directions parallel to the base side of the housing (in-plane vibrations). The various vibroacoustic signals need not be generated simultaneously, nor need they be generated by the same hardware.

The invention also includes methods for characterizing electronic-device vibroacoustics. These methods include the substitution of a vibroacoustic emulator for a vibroacoustic-producing component in an electronic device. Preferably, the remainder of the electronic device is unaltered. Controlled vibroacoustics are generated with the vibroacoustic emulator. One or more quantities are measured that relate to the system vibroacoustics. For instance, the total sound power, sound pressure level/sound quality at the operator position, sound intensity maps, and/or the vibration of the computer might be measured by such devices as accelerometers, microphones, sound intensity probes, binaural heads, or laser vibrometers. One or more system transfer functions can be developed to relate specific vibroacoustic inputs to important system quantities. This level of electronic-device vibroacoustic characterization provides designers of the vibroacoustic-producing component with critical information that will allow them, for the first time, to design devices that will have known system vibroacoustics impact.

Additional features and advantages of the invention will be set forth in part in the description that follows, and in part will be obvious from the description, or may be learned by practice of the invention. Various embodiments of the invention do not necessarily include all of the stated features or achieve all of the stated advantages.

BRIEF DESCRIPTION OF THE DRAWINGS

The accompanying drawings illustrate an embodiment of the invention according to the best modes so far devised for the practical application of the principles thereof. In section views, surfaces cut by the section plane are indicated by hatching or patterned fill.

DETAILED DESCRIPTION

Figure 1:
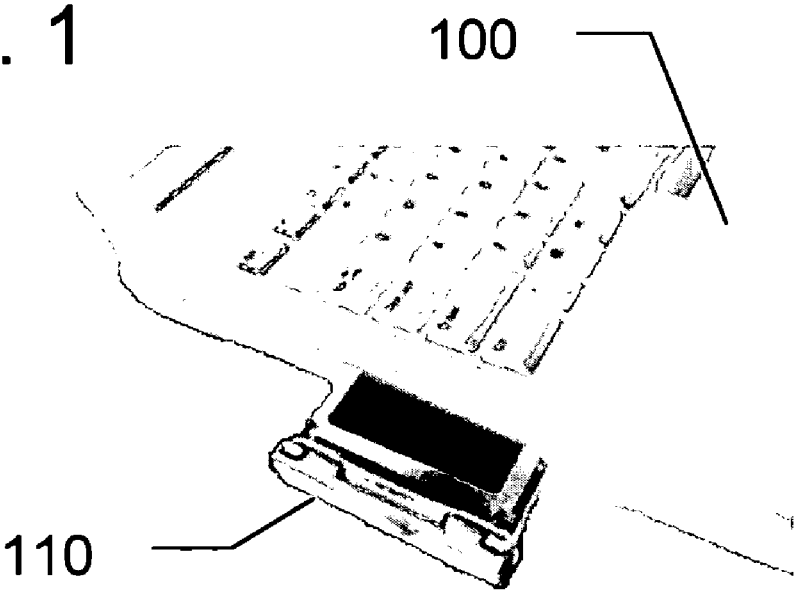
FIG. 1 illustrates a portion of a laptop computer showing where the hard disk drive fits.

Referring now to the drawings, where similar elements are identified with the same reference numbers, FIG. 1 depicts a portion of a computer 100 showing where the hard disk drive 110 is positioned. As discussed previously, the hard disk drive is one of the important sources of noise in computers and other electronic devices, such as TiVo's and MP3 jukeboxes. The particular computer 100 shown in FIG. 1 is a laptop computer.

Although the use of component vibroacoustic emulation has potential payoffs for all computers and electronic devices, noise emulation prior to the design of a component is especially important for laptop computers and other mobile electronic devices. A desktop or server computer is typically large enough to accommodate some form of noise shielding should a noise problem be diagnosed after the system is built. On the other hand, minimizing space and weight are important design criteria for mobile devices, so retrofitting the installation of a component after it has been built is highly undesirable and often not practical.

Figure 2:
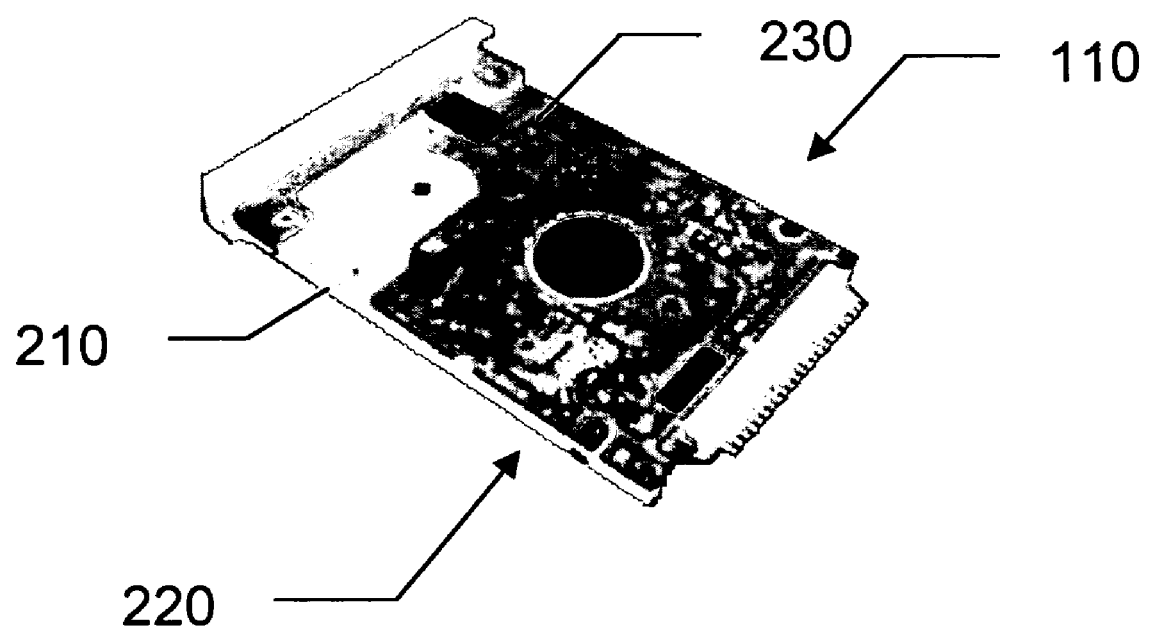
FIG. 2 shows a hard disk drive. Various portions of the housing are identified.

FIG. 2 shows a hard disk drive 110 and indicates the housing 210 with its cover side 230. The base side 220 is disposed opposite the cover side 230. In FIG. 2, the base side 220 is obscured by the cover side 230 and other parts of the housing 210, but would be seen in the general location of the arrow associated with reference numeral 220 if the other elements were not present.

Various embodiments of the invention involve a vibroacoustic emulator that comprises a housing 210 that is similar to that of the component to be simulated and a means, coupled to the housing 210, for producing controlled variable vibroacoustic signals that simulate those of an electronic-device component. The means for producing the controlled vibroacoustic signals can be quite varied. The invention is intended to include those specific means described below as well other means for producing controlled variable vibroacoustic signals that simulate the vibroacoustic signals produced by a component of an electronic device. Some of these means specifically target different vibroacoustic-producing mechanisms. A vibroacoustic emulator, as understood herein does not need to include simulation capability for all relevant vibroacoustic-producing mechanisms.

Alternative embodiments that combine the functions of the various vibroacoustic emulators described below are within the scope of the invention, but are not required for any particular vibroacoustic emulator.

Figure 3:
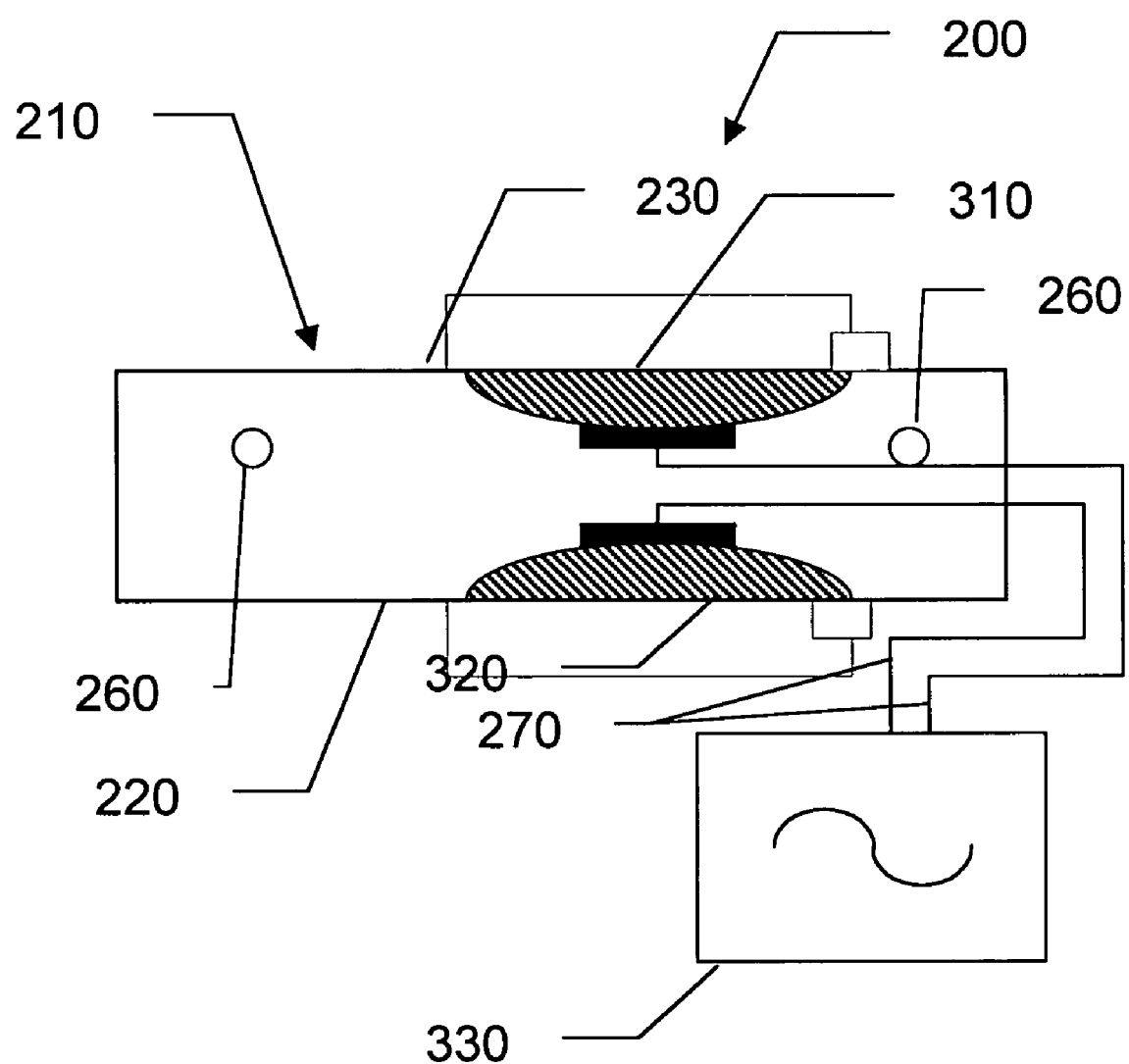
FIG. 3 illustrates an embodiment of a vibroacoustic emulator equipped with speakers on opposing sides of the housing.

FIG. 3 illustrates an embodiment of a vibroacoustic emulator 200. This particular embodiment is suitable for simulating the acoustic sources that emanate from both the cover side 230 and the base side 220 of a hard disk drive. The vibroacoustic emulator 200 includes a housing 210 with a base side 220 and a cover side 230. The base side 220 and the cover side 230 are substantially parallel. The base side 220 defines in-plane directions (those that could be decomposed into components parallel to the base side 220). The out-of-plane direction is perpendicular to the in-plane directions.

The vibroacoustic emulator 200 of FIG. 3 is equipped with a first speaker 310 coupled to the cover side 230 of the housing 210 and a second speaker 320 coupled to the base side 220 of the housing 210. To best simulate how the system will respond with a real hard disk drive, the vibroacoustic emulator 200 preferably has dimensions and mechanical attachment fixtures that replicate those of the hard disk drive being emulated. The embodiment in FIG. 3 includes screw holes 260 that will facilitate the attachment of the vibroacoustic emulator 200 into the system in the same way that a hard disk drive would be attached. Although a hard disk drive typically has separate parts for the base and the cover, the vibroacoustic emulator 200 may be a block of appropriately sized material in which the speakers 310 and 320 are embedded. Hence, in this document, the cover side 230 refers to the side of the vibroacoustic emulator 200 where the cover of the simulated hard disk drive would be located and the base side 220 refers to the side of the vibroacoustic emulator 200 where the base of the simulated hard disk drive would be located.

Embodiments of the vibroacoustic emulator 200 include a first speaker signal generator coupled to the first speaker 310 and a second speaker signal generator coupled to the second speaker 320. In many embodiments, the first speaker signal generator and the second speaker signal generator share some or all of the same hardware. Hence, in some embodiments, the first and second speaker signal generators are the same part. For instance, as shown in FIG. 3 the first speaker 310 is coupled to a first channel of the speaker signal generator 330 through a cable 270 and the second speaker 320 is coupled to a second channel of the speaker signal generator 330 through a separate cable 270. Preferably, the cables 270 are sufficiently lightweight so that they do not unduly influence the system vibroacoustics and are sufficiently small that they can be routed out of the system without undue modification to the system. Alternate embodiments wire the speakers to the same channel of the speaker signal generator 330, thereby providing both the first speaker 310 and the second speaker 320 with substantially the same input signals.

The speaker signal generator 330 drives the first 310 and second 320 speakers at desired frequencies and amplitudes by providing controlled input signals to them. In the embodiment shown, the speaker signal generator 330 is outside the housing 210 and in most embodiments would be disposed outside of the computer or other electronic device to be tested. An external power source (not shown) provides power to the speaker signal generator 330, which then transforms the power into appropriate input signals for the first 310 and second 320 speakers. Placing the speaker signal generator 330 outside the device limits any vibroacoustical interference that the speaker signal generator 330 might cause to the system were it to be located inside the device. However, the speaker signal generator 330 may be located inside the device or indeed inside the emulator if space allows and if its interference with the system is sufficiently small.

In the embodiment shown in FIG. 3, the first speaker 310 is flush mounted with the cover side 230 and the second speaker 320 is flush mounted with the base side 220. Disk drives for mobile applications are generally thin. A vibroacoustic emulator for a thin hard disk drive would include speakers that are thin enough so that two of them can be mounted in the same thickness as the disk drive. Preferably, the first 310 and second 320 speakers are each less than about 2 mm thick. In addition, the first 310 and second 320 speakers preferably have a frequency response as low as 70 Hz for simulating a 4200 RPM disk drive. For vibroacoustic emulators of mobile hard disk drives, piezoelectric speakers are preferred because of their small thickness. Although a somewhat lower limit on frequency response would be preferred, speakers that are 57 mm square and 2 mm thick, having a frequency response down to 100 Hz have been found suitable for use in a vibroacoustic emulator 200.

Figure 4:
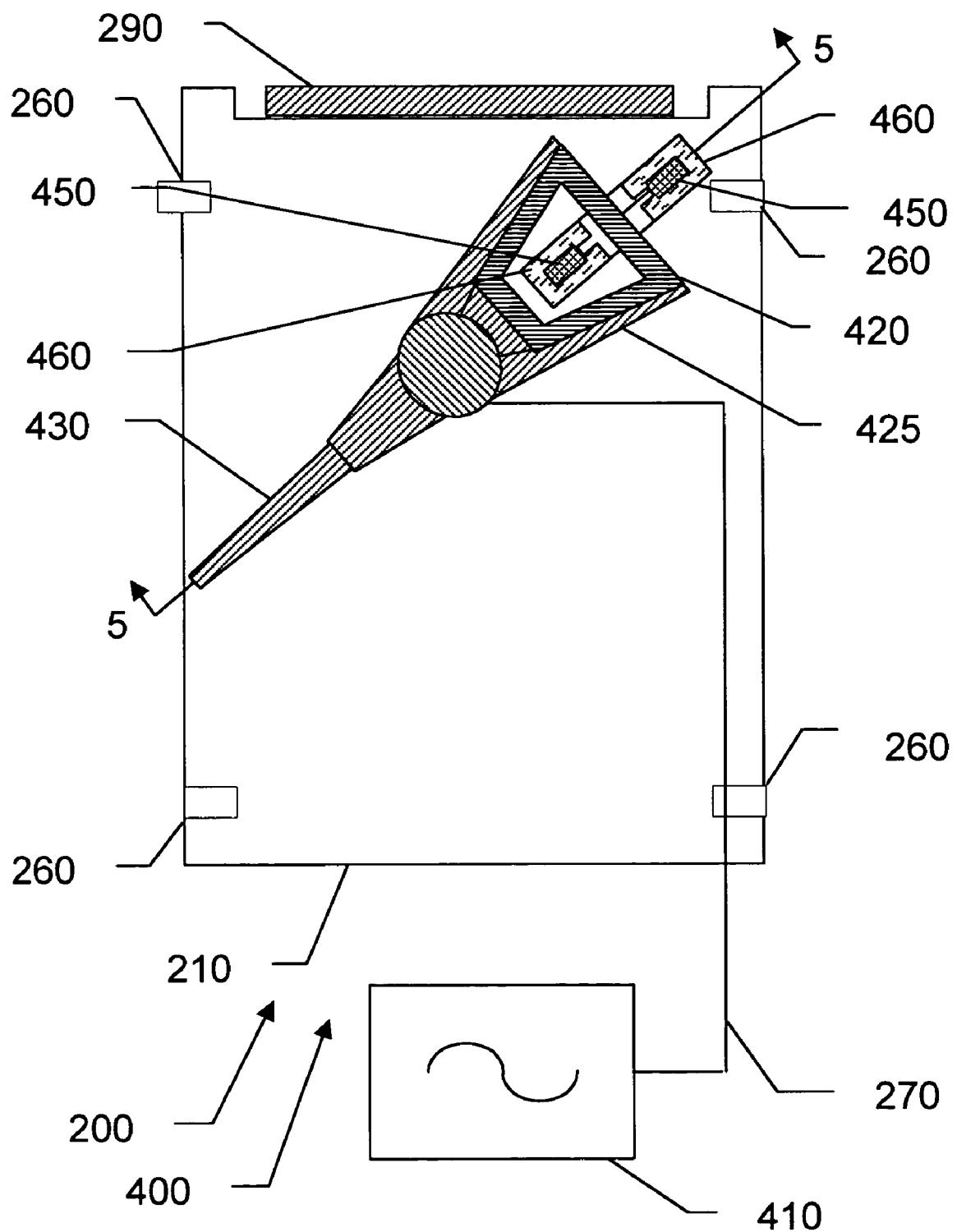
FIG. 4 shows a top section view of an embodiment of a vibroacoustic emulator for producing an out-of-plane vibration.
Figure 5:
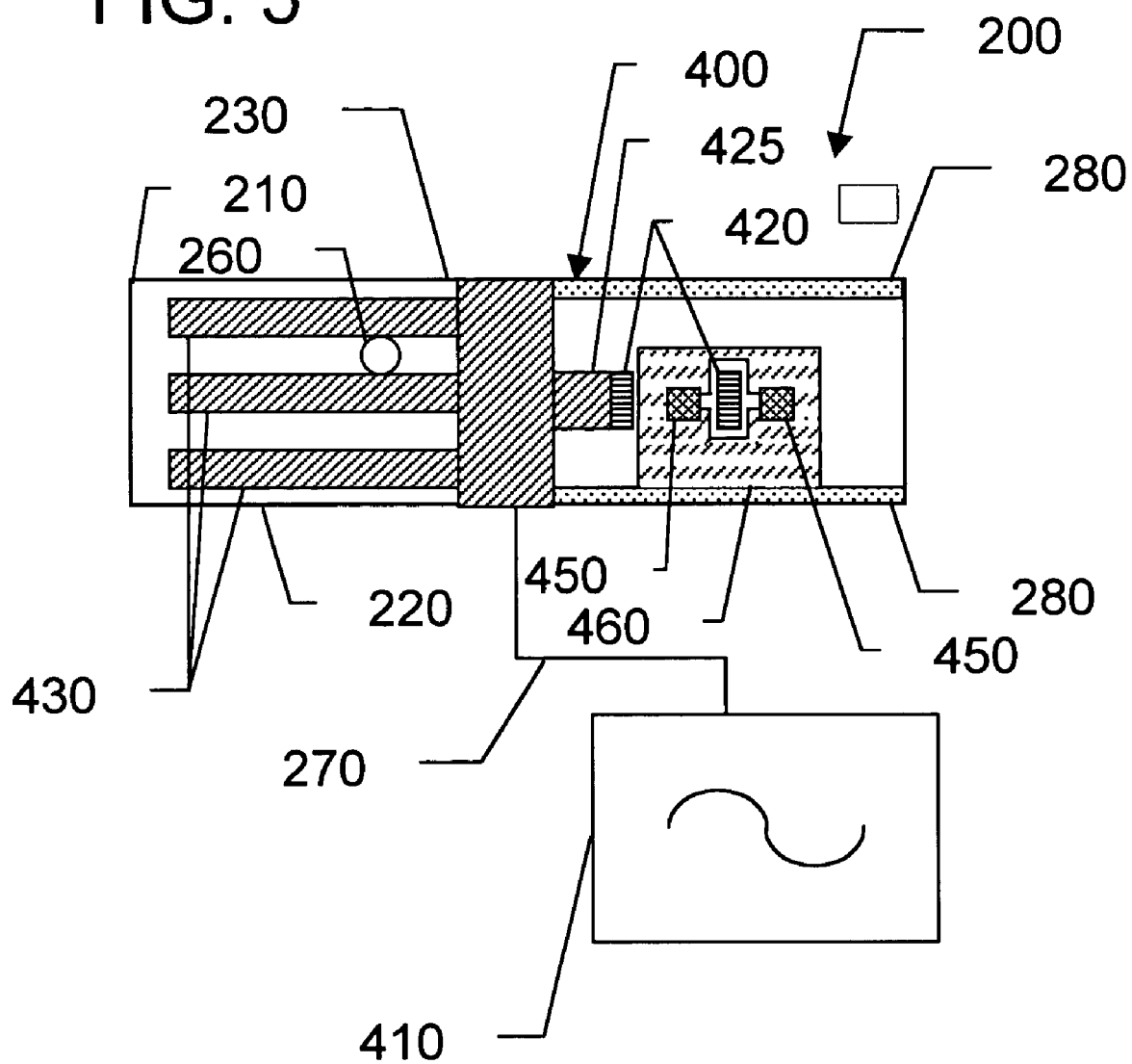
FIG. 5 illustrates a section view taken through the section 5-5 of FIG. 4.

FIGS. 4 and 5 show a vibroacoustic emulator 200 for simulating seek operations of a hard disk drive. Seek operations typically produce out-of-plane vibrations, i.e., vibrations perpendicular to the base side 220 of the housing 210 and therefore require an out-of-plane vibration source (shown generically as 400). In the embodiment shown in FIGS. 4 and 5, an effort was made to retain much of the internal hardware that would exist in an actual hard disk drive. Alternate embodiments may include more or fewer of the internal components, depending upon the specific mechanisms used to generate the out-of-plane vibrations and the desired fidelity of the vibrations compared to an actual hard disk drive. In the particular embodiment shown, screw holes 260 and a connector pin mount 290 are included.

In FIGS. 4 and 5 a coil support arm 425 supports a wire coil 420 that is suspended in a magnetic field in the plane of the wire coil 420. In the embodiment shown, the wire coil 420 is part of the actuator that positions the actuator arms 430 to desired positions over a disk. To restrain the actuators arms 430 from moving during the vibration simulation, the actuator is locked in place so that it cannot rotate. This can be done, for instance, by pinning the actuator through the base side 220 of the housing 210.

In the embodiment shown in FIGS. 4 and 5, two magnets 450 are used to produce a magnetic field in the plane of the wire coil 420. A yoke 460 made from ferromagnetic material, preferably steel, joins the two magnets 450, thereby providing a complete magnetic path. For the situation in which the vibroacoustic emulator 200 is designed to use the internal components from a mobile hard disk drive, the magnets 450 are preferably sized to be the approximately the largest that can be accommodated within the wire coil 420. For current mobile hard disk drives, this results in magnets that are preferably about 6 mm in diameter and about 6 mm long. If future hard disk drives become smaller, the preferred size for the magnets will decrease. Neodymium-iron-boron (NdFeB) magnets are preferred because of their magnetic strength; therefore the magnets 450 can be relatively small and still produce a sufficiently strong magnetic field. Other mechanisms for a producing a magnetic field in the plane the wire coil 420 can be used in other embodiments.

Upon providing current through the wire coil 420, the wire coil 420 will be deflected in the out-of-plane direction. The amount and phasing of the current is controlled by an out-of-plane signal generator 410 that provides input signals to the wire coil 420. As with other vibroacoustic emulators, any cabling connecting the out-of-plane signal generator 410 with the out-of-plane vibration source 400 is preferably sufficiently lightweight so as to not unduly influence the system vibroacoustics.

As shown in FIG. 5, in some embodiments, constraint layer dampers 280 are added to the cover side 230 and the base side 220. The constraint layer dampers 280 reduce airborne sound emissions through the base side 220 and the cover side 230, thereby facilitating the system characterization of the induced solid-borne vibrations of the hard disk drive, without interference from the airborne sound emissions. Although constraint layer dampers may also be added to the other sides of the vibroacoustic emulator, the primary airborne sound emissions are through the base side 220 and the cover side 230, hence damping those sides is typically sufficient.

Figure 6:
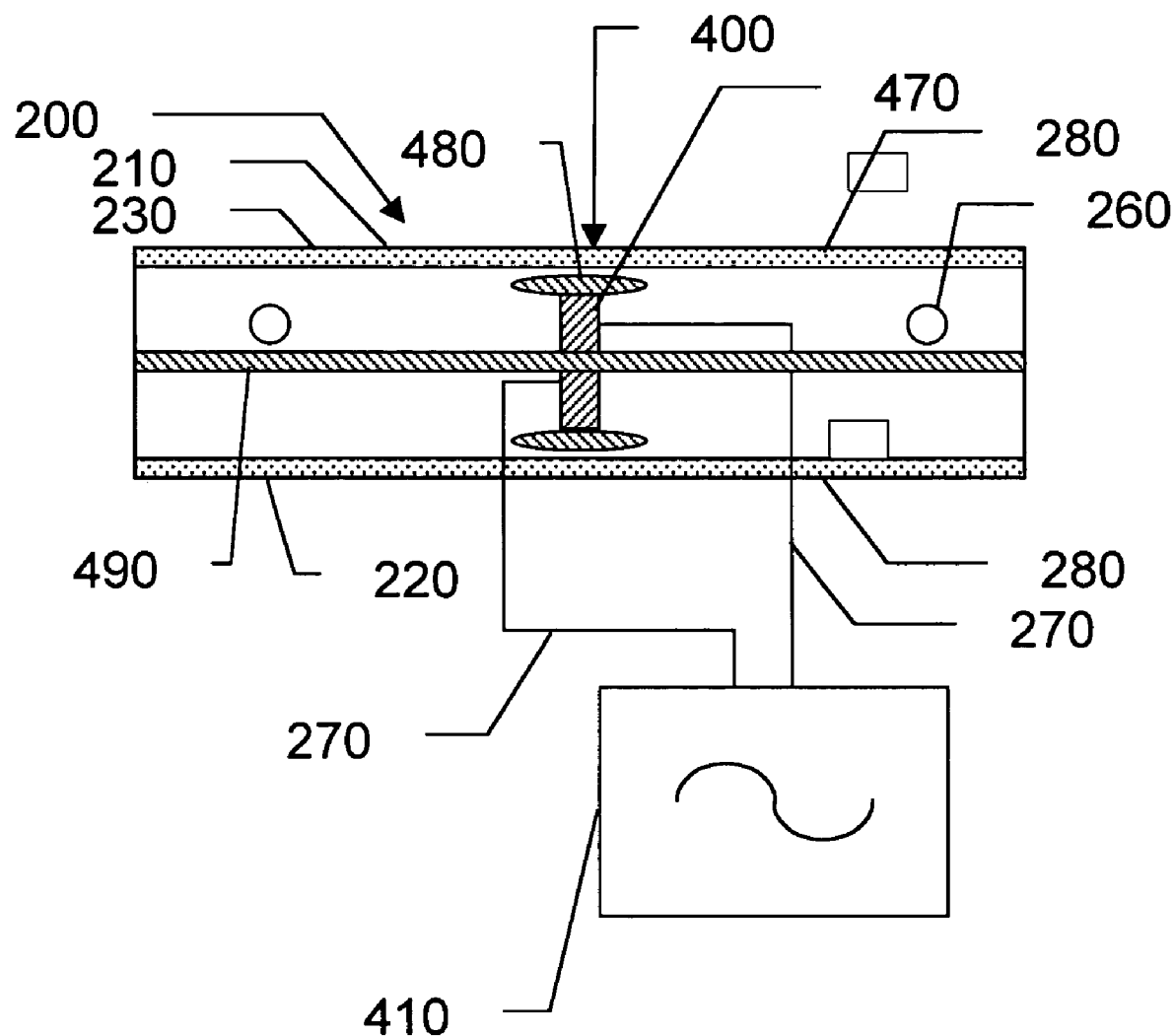
FIG. 6 illustrates a side section view of an alternate embodiment of a vibroacoustic emulator for producing an out-of-plane vibration.

Alternate embodiments for an out-of-plane vibration source 400 include one or more piezoelectric actuators for providing vibrations in the out-of-plane direction. As shown in FIG. 6, the out-of-plane vibration source 400 includes two piezoelectric stacks 470 (only one is labeled to reduce clutter). Each piezoelectric stack 470 is coupled to a support element 490 at a proximal end and an end mass 480 at a distal end. In this embodiment, each piezoelectric stack 470 is driven by an out-of-plane signal generator 410 coupled to each piezoelectric stack 470 through separate cables 270. In some embodiments, constraint layer dampers 280 are added to the cover side 230 and the base side 220. Variants of the out-of-plane vibration source 400 shown in FIG. 6 include more or fewer piezoelectric stacks 470. The piezoelectric stacks 470 may be individually driven or their motions may be coupled to be either in phase or out of phase with other piezoelectric stacks 470. In addition, the piezoelectric stacks 470 may be arranged either symmetrically or asymmetrically and may be attached to a common support element 490 or separate support elements 490. In various embodiments, the support element 490 can have different shapes. Preferably the support element 490 acts as either a plate or a beam.

Figure 7:
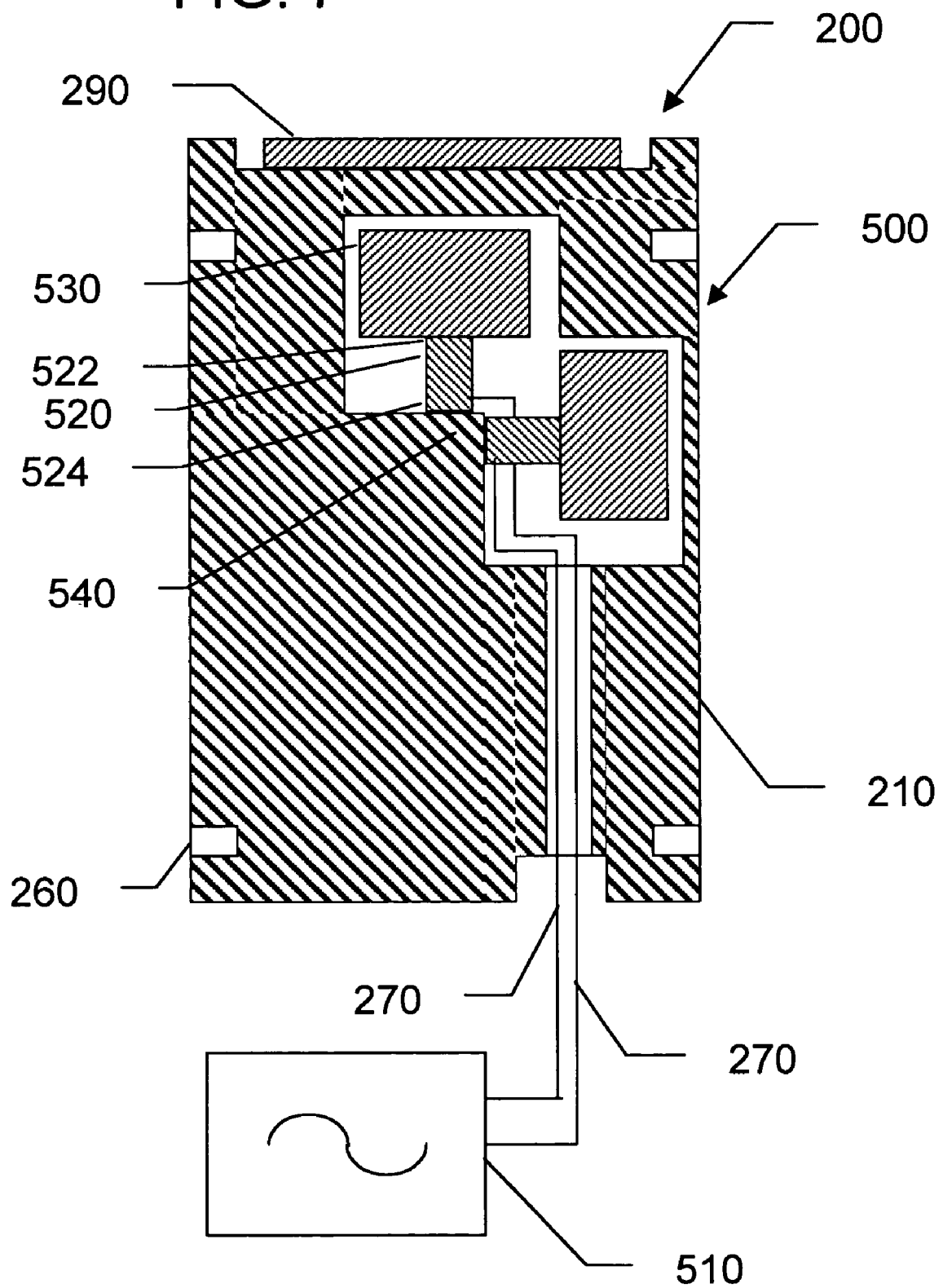
FIG. 7 shows a section view of an embodiment of a vibroacoustic emulator for producing an in-plane vibration.

In-plane vibrations are produced by the motors that spin hard disks. In the context of hard disk drives, in-plane vibrations are those that are substantially in a plane parallel to the base side of the housing 210. An embodiment of a vibroacoustic emulator 200 designed to simulate these in-plane vibrations is shown in FIG. 7. An in-plane vibration source (shown generically with reference numeral 500) is coupled to the housing 210.

Screw holes 260 (only one of which is labeled) and a connector pin mount 290 facilitate attachment to a computer (not shown). An in-plane signal generator 510 is coupled to the in-plane vibration source 500. In the embodiment shown in FIG. 7, the in-plane vibration source 500 includes a plurality of piezoelectric stacks 520 that vibrate in-plane. Each piezoelectric stack 520 has a proximal end 524 connected to a common mount 540. The common mount 540 is preferably rigid. In the embodiment illustrated in FIG. 7, the common mount 540 is a block that includes the housing 210. Each piezoelectric stack 520 also has a distal end 522 connected to an end mass 530. Piezoelectric stacks 520 that range in size from approximately 2×3 mm in cross section and approximately 5 to 10 mm long, to piezoelectric stacks 520 that are approximately 6×6 mm in cross section and approximately 10 mm long have been found to be particularly useful for generating in-plane vibrations. Such piezoelectric actuators can be driven by voltages of approximately 100-150 V. Each end mass 530 is typically made of stainless steel or lead. In one embodiment, each end mass 530 has a mass of approximately 20 grams. However, different materials and sizes for the end masses 530 can be used in alternative embodiments. In some alternative embodiments, end masses 530 are not used.

The embodiment shown in FIG. 7 includes two piezoelectric stacks 520 oriented orthogonally to each other. The in-plane signal generator is organized to provide phased input signals to the piezoelectric stacks 520 such that a rotating in-plane force is synthesized. Many alternative embodiments for the in-plane signal generator 500 exist. For instance three or four piezoelectric stacks 520 can also easily synthesize a rotating in-plane force. With three piezoelectric stacks 520 the stacks would preferably be spaced at 120 degree intervals, although embodiments without symmetric spacing can also be used. In embodiments with four piezoelectric stacks 520, wiring them as orthogonal pairs facilitates the synthesis of a rotating force. In yet other embodiments, a different type of actuator may be used. For instance, the in-plane actuators may be magnetically driven rather than piezoelectrically driven. Alternative spacings of the piezoelectric stacks 520 with or without symmetries may be appropriate in alternative embodiments. In other embodiments, the phasing of input signals may be different. Other embodiments may include constraint layer dampers as discussed for the out-of-plane vibroacoustic sources. All of these variations as well as other variations that would be obvious to one skilled in the art are intended to fall within the broad scope of this invention.

In the vibroacoustic emulators described above, the weight of the various vibroacoustic emulators can be increased by the addition of separate weights or the use of heavier materials. Similarly, the weight can be decreased by using lighter materials or by removing non-essential components. In most embodiments, the weight of the vibroacoustic emulator is matched to the weight of the hard disk drive (or other component being simulated). However, this is not always necessary and in some cases may not be desired. For instance, other properties of either the vibroacoustic emulator or the system to be simulated may differ from the actual system in ways that can be compensated for by altering the weight of the vibroacoustic emulator. For instance, the stiffness of the vibroacoustic emulator may not be matched precisely to the stiffness of the component being simulated. However, the difference in stiffness can be compensated by altering the weight of the emulator and the strength of the applied vibrations.

The invention also includes methods for using vibroacoustic emulators to help characterize the vibroacoustics of various devices. For instance, with respect to hard disk drives, a method for emulating hard-disk-drive vibroacoustics includes the generation of three separate vibroacoustic signals. These signals include the acoustic waves that initially travel perpendicular to the base side of the housing, vibratory motions in directions perpendicular to the base side of the housing, and vibratory motions in directions parallel to the base side of the housing. Preferably, each of the separate vibroacoustic signals is independently controlled. Independent control allows for better fidelity in the simulation of the hard disk drive and greater understanding of the influence of the separate vibroacoustic signals. For instance, in some embodiments, the vibratory motions parallel to the base side of the housing synthesize a rotating force, such as the motor that spins the hard disk drives. By independently controlling the vibroacoustic signals, different motors can be simulated keeping the remainder of the simulation the same.

Figure 8:
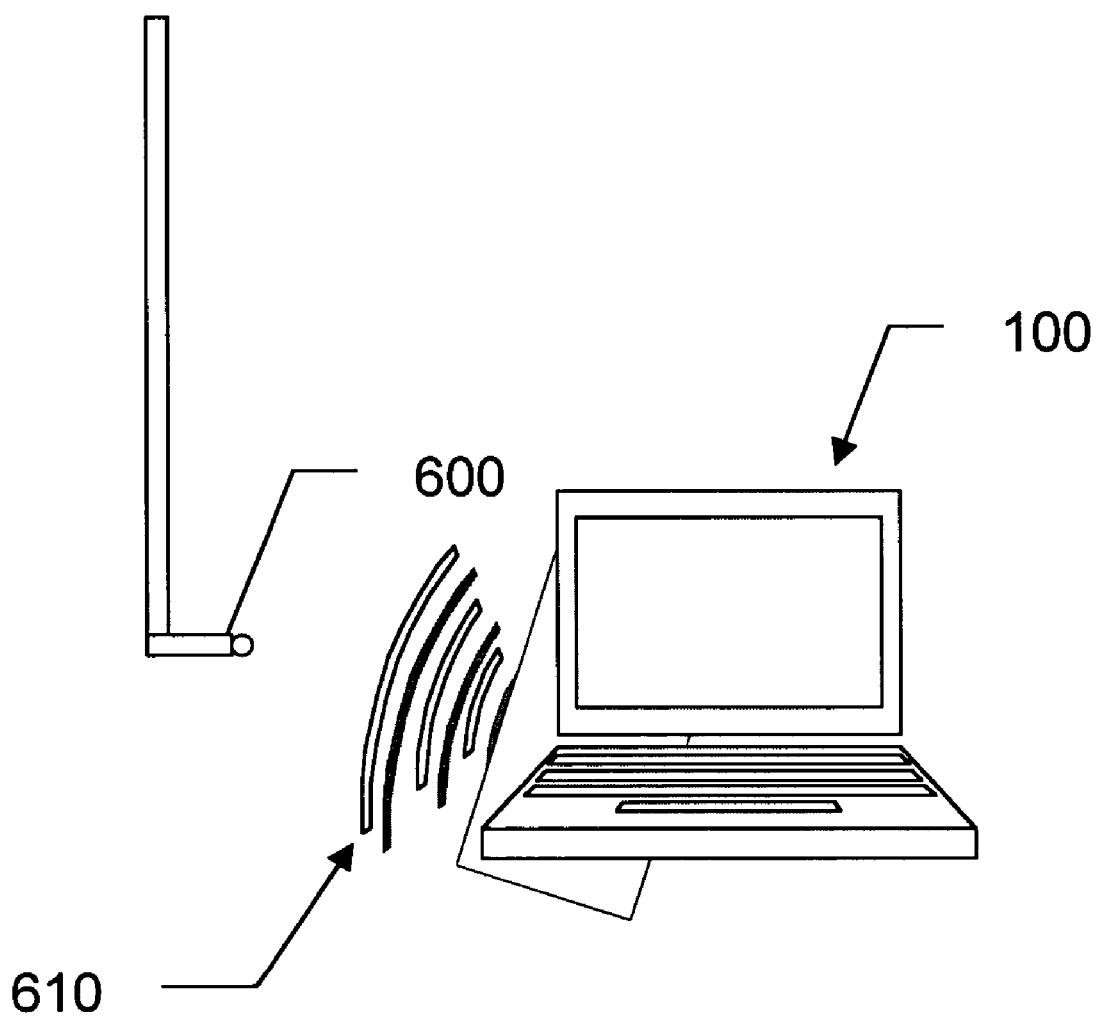
FIG. 8 illustrates sound intensity being measured from a computer equipped with a vibroacoustic emulator.

To simulate an actual system, the hard-disk-drive vibroacoustic emulator is disposed in an electronic device where a hard disk drive would be positioned. With the vibroacoustic emulator in place, the system response to the vibroacoustic signals is measured. FIG. 8 illustrates the measurement of sound waves 610 from a computer 100 fitted with a vibroacoustic emulator. The sound waves 610 are measured with a measurement device 600. The measurement device 600 may be a microphone, a sound level meter, a sound intensity probe, a phased microphone array, or any other device sensitive to sound waves. The vibroacoustic characterization could also include the measurement of vibrations of the computer 100, for instance, with one or more accelerometers or laser vibrometers.

An important aspect of characterizing the vibroacoustics of a device is the determination of a system transfer function for the device. The system transfer function relates the controlled vibroacoustics that are generated by the vibroacoustic emulator to some system vibroacoustic quantity. The system vibroacoustic quantity can be either a sound or vibration quantity that is measured or derived from one or more measurements of the system. As a simplistic example, assume that a vibroacoustic emulator similar to that illustrated in FIG. 3, is driven by its signal generator to produce sound waves with an amplitude $X_{acoustic}(f)$ at a frequency f. When the vibroacoustic emulator is placed inside a computer or other electronic device, and is driven by the same signals from the signal generator, a system sound power level $Y_{acoustic}(f)$ is measured by some measuring device. The input sound produced by the vibroacoustic emulator is related to the measured sound power level by a transfer function $H_{acoustic}(f)$ such that:

$$Y_{acoustic}(f) = H_{acoustic}(f) * X_{acoustic}(f)$$

Note that the transfer function may be dimensional and thereby account for differences in dimensions between the input quantity $X_{acoustic}(f)$ and the output quantity $Y_{acoustic}(f)$. The need for this will be clearer if we consider another example with a vibratory input, and a measured sound power level as output. For this example consider the vibratory out-of-plane forces generated by a vibroacoustic emulator similar to those shown in FIGS. 4 and 5 or in FIG. 6. When driven by specified signals from the out-of-plane signal generator, the vibroacoustic emulator produces vibrations that are characterized by an acceleration of amplitude $X_{out-of-plane}(f)$ of the cover side (or the base side) of the housing. When the vibroacoustic emulator is coupled to a computer or other electronic device, a system sound power level $Y_{out-of-plane}(f)$ is measured by some measuring device. The acceleration of the vibroacoustic emulator is related to the measured sound power level by a dimensional transfer function $H_{out-of-plane}(f)$ such that:

$$Y_{out-of-plane}(f) = H_{out-of-plane}(f) * X_{out-of-plane}(f)$$

In a similar manner, a vibroacoustic emulator similar to that illustrated in FIG. 7 that produces a rotating in-plane force can have its input $X_{in-plane}(f)$ related to the system output $Y_{in-plane}(f)$, by a transfer function $H_{in-plane}(f)$.

In general, with known transfer functions, the system behavior $Y(f)$ can be predicted if the vibroacoustic input $X(f)$ is known. Hence, the system vibroacoustic impact of modifications to a component in an electronic device can be predicted based on knowledge of the appropriate transfer function and the vibroacoustic input generated by the component. One skilled in the art would realize that considerable flexibility exists in the choice of the particular quantities used to characterize the vibroacoustic input $X(f)$ and the system vibroacoustic output $Y(f)$. This invention is not limited to any specific choice of these quantities.

Knowledge of the vibroacoustic characteristics of an electronic device can facilitate the design of components for the electronic device. For instance, if the controlled vibroacoustics are varied to determine noise resonances of the electronic device, these resonances can be avoided in the design of the component by avoiding producing inputs that are similar to the controlled vibroacoustics that produced the resonances. On the other hand, if the controlled vibroacoustics are varied and specific parameters of the controlled vibroacoustics are determined that produce maximal reductions to the end-user perceived noise, these parameters would preferably be reproduced by the actual component.

The above description and drawings are only illustrative of some example embodiments, and the present invention is not intended to be limited thereto. Any additional modification of the present invention that comes within the spirit and scope of the following claims is considered part of the present invention.

What is claimed is:

1. A method for emulating hard-disk-drive vibroacoustics comprising: generating first independently controlled acoustic waves initially traveling perpendicular to a base side of a housing; generating first independently controlled vibratory motions in directions perpendicular to the base side of the housing; generating second independently controlled vibratory motions in directions parallel to the base side of the housing, and generating emulated hard-disk-drive vibroacoustics from the housing using the first independently controlled acoustic waves, and the first and the second independently controlled vibratory motions.

2. The method for emulating hard-disk-drive vibroacoustics, according to claim 1, wherein the independently controlled vibratory motions in directions parallel to the base side of the housing synthesize a rotating force.

3. The method for emulating hard-disk-drive vibroacoustics, according to claim 1, wherein the housing is disposed in an electronic device where a hard disk drive would be positioned.

4. The method for emulating hard-disk-drive vibroacoustics, according to claim 1, further comprising: measuring the system response to the independently controlled acoustic waves, vibratory motions in directions perpendicular to the base side of the housing, and vibratory motions in directions parallel to the base side of the housing.

5. A vibroacoustic emulator for emulating vibroacoustics of a hard disk drive, comprising: a housing having: a base side defining in-plane directions parallel to the base side and an out-of-plane direction perpendicular to the in-plane directions; a cover side substantially parallel to the base side; the housing having dimensions and mechanical attachment fixtures that replicate those of the hard disk drive; and a vibroacoustic generator coupled to the housing comprising an out-of-plane vibration source, wherein the out-of-plane vibration source comprises: a wire coil suspended in a plane substantially parallel to the base side of the housing; a magnetic field producer for producing a magnetic field parallel to the plane of the wire coil; and an out-of-plane vibration signal generator for providing input signals to the wire coil.

6. The vibroacoustic emulator of claim 5, wherein the magnetic field producer comprises NdFeB magnets joined by a yoke.

7. A vibroacoustic emulator for emulating vibroacoustics of a hard disk drive, comprising: a housing having: a base side defining in-plane directions parallel to the base side and an out-of-plane direction perpendicular to the in-plane directions; a cover side substantially parallel to the base side; the housing having dimensions and mechanical attachment fixtures that replicate those of the hard disk drive; and a vibroacoustic generator coupled to the housing comprising an out-of-plane vibration source, wherein the out-of-plane vibration source comprises: a support element coupled to the housing; a piezoelectric stack having a proximal end and a distal end, the piezoelectric stack being coupled at its proximal end to the support element; and an end mass coupled to the distal end of the piezoelectric stack.

8. A vibroacoustic emulator, comprising: a housing; and a means for producing controlled variable vibroacoustic signals that simulate those of a hard disk drive, wherein
the means is coupled to the housing and comprises:
an out-of-plane actuator for producing vibrations perpendicular to the plane of the in-plane actuators; and
an out-of-plane signal generator for providing input signals for driving the out-of-plane actuator;
the housing is disposed in an electronic device where a hard disk drive would be positioned; and
the housing has dimensions and mechanical attachment fixtures that replicate those of the hard disk drive being emulated.

9. The vibroacoustic emulator of claim 8 wherein the rotational signal generator and the out-of-plane signal generator share the same hardware.

10. The vibroacoustic emulator of claim 8 wherein the means for producing controlled variable vibroacoustic signals further comprises: a first sneaker coupled to a first side of the housing; and a first speaker signal generator for providing input signals for driving the first speaker.

11. The vibroacoustic emulator of claim 10 wherein the first speaker signal generator and the rotational signal generator share the same hardware.

12. The vibroacoustic emulator of claim 10 wherein the first sneaker signal generator and the in-plane signal generator share the same hardware.

* * * * *